(12) United States Patent
Ammineni et al.

(10) Patent No.: US 7,558,668 B2
(45) Date of Patent: Jul. 7, 2009

(54) EXHAUST SYSTEM HAVING TEMPERATURE SENSOR VERIFICATION

(75) Inventors: Chandini M. Ammineni, Peoria, IL (US); Michael P. Withrow, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 91 days.

(21) Appl. No.: 11/987,490

(22) Filed: Nov. 30, 2007

(65) Prior Publication Data

US 2009/0143953 A1 Jun. 4, 2009

(51) Int. Cl.
*F01N 3/00* (2006.01)
(52) U.S. Cl. .................................. 701/114; 60/287
(58) Field of Classification Search .................. 701/114, 701/108, 109, 115; 60/274, 277, 286, 297, 60/301
See application file for complete search history.

(56) References Cited

U.S. PATENT DOCUMENTS

| | | | |
|---|---|---|---|
| 5,067,973 A * | 11/1991 | Pattas | ........................... 60/286 |
| 5,826,425 A | 10/1998 | Sebastiano et al. | |
| 6,634,170 B2 | 10/2003 | Hiranuma et al. | |
| 6,935,105 B1 | 8/2005 | Page et al. | |
| 7,111,455 B2 | 9/2006 | Okugawa et al. | |
| 7,117,079 B2 | 10/2006 | Streichsbier et al. | |
| 7,117,667 B2 * | 10/2006 | Mital et al. | .................... 60/286 |
| 7,159,392 B2 | 1/2007 | Kondoh et al. | |
| 7,210,285 B2 | 5/2007 | Sato et al. | |
| 7,243,491 B2 | 7/2007 | Okugawa et al. | |
| 2004/0035101 A1 | 2/2004 | Imai et al. | |
| 2004/0226287 A1 | 11/2004 | Edgar et al. | |
| 2007/0006574 A1 | 1/2007 | Nakano | |
| 2007/0047616 A1 | 3/2007 | Izumiura et al. | |
| 2007/0101699 A1 | 5/2007 | McNulty et al. | |
| 2007/0130922 A1 | 6/2007 | Dye et al. | |

* cited by examiner

*Primary Examiner*—Hieu T Vo
(74) *Attorney, Agent, or Firm*—Finnegan, Henderson, Farabow, Garrett & Dunner

(57) ABSTRACT

An exhaust system is disclosed. The exhaust system has a first sensor disposed to sense a first temperature of an exhaust flow and a second sensor disposed to sense a second temperature of the exhaust flow. The exhaust system also has a controller in communication to receive from the first and second sensors signals indicative of the first and second temperatures. The controller is configured to compare the signals indicative of the first and second temperatures during exhaust system thermal equilibrium, to determine whether at least one of the signals indicative of the first and second temperatures is inaccurate based on the comparison, and to affect a system reaction if it is determined that at least one of the signals indicative of the first and second temperatures is inaccurate.

20 Claims, 2 Drawing Sheets

EXHAUST SYSTEM HAVING TEMPERATURE SENSOR VERIFICATION

TECHNICAL FIELD

The present disclosure is directed to an exhaust system and, more particularly, to an exhaust system having temperature sensor verification.

BACKGROUND

Engines, including diesel engines, gasoline engines, gaseous fuel powered engines, and other combustion engines exhaust gasses having a complex mixture of air pollutants. These pollutants include, among other things, solid material known as particulate matter or soot. Due to increased attention on the environment, exhaust emission standards have become more stringent, and the amount of particulate matter emitted from an engine is regulated depending on the type of engine, size of engine, and/or class of engine.

Exhaust systems have been developed to manage the exhaust gases from combustion engines. Exhaust systems usually include a conduit that directs the exhaust gases away from the engine for subsequent treatment by various devices. The devices include, for example, a diesel particulate filter (DPF) to trap the particulate matter, and a regeneration device, such as a burner, to periodically regenerate the DPF. Other devices, such as turbochargers that use the exhaust gases to generate auxiliary power, can also be included. Exhaust systems are sometimes equipped with temperature and pressure sensors to monitor the temperature and pressure of the exhaust gases at various points. The monitored temperatures and pressures are used for diagnostic and control purposes, e.g., to verify compliance with regulations and/or to control regeneration of the DPF.

One method of diagnosing exhaust system performance is described in U.S. Patent Application Publication No. 2007/0101699 by McNulty et al. published on May 10, 2007 (the "'699 publication"). The '699 publication discloses a system that compares temperatures measured by adjacent temperature sensors in an exhaust system to determine whether one of the sensors is "stuck within range" prior to performing an exhaust system diagnostic test to ensure the results of the test are meaningful.

Although the system of the '699 publication may improve the results of exhaust system diagnostic tests in some cases, it may be unreliable. For instance, the system only determines whether the temperature sensors are "stuck within range." The system may not identify a malfunctioning sensor which, although not "stuck within range" (i.e., not stuck at a specific value), provides an inaccurate or inaccurate reading of its respective temperature. The results of a subsequent exhaust system diagnostic test may thus be fouled. In addition, the exhaust system could be compromised by continuing operation with temperature sensors in this condition.

This disclosure is directed to overcoming one or more of the problems set forth above.

SUMMARY

One aspect of the disclosure is directed to an exhaust system. The exhaust system may include a first sensor disposed to sense a first temperature of an exhaust flow and a second sensor disposed to sense a second temperature of the exhaust flow. The exhaust system may also include a controller in communication to receive from the first and second sensors signals indicative of the first and second temperatures. The controller may be configured to compare the signals indicative of the first and second temperatures during exhaust system thermal equilibrium, to determine whether at least one of the signals indicative of the first and second temperatures is inaccurate based on the comparison, and to affect a system reaction if it is determined that at least one of the signals indicative of the first and second temperatures is inaccurate.

Another aspect of the disclosure is directed to an exhaust system sensor verification method. The method may include sensing a first and second temperatures of an exhaust flow, providing indications of the first and second sensed temperatures. The method may further include comparing the indications of the first and second sensed temperatures during an exhaust system exhaust system thermal equilibrium, determining whether at least one of the indications of the first and second sensed temperatures is inaccurate based on the comparison, and affecting a system reaction if it is determined that at least one of the indications of the first and second sensed temperatures is inaccurate.

DETAILED DESCRIPTION

Figure 1:
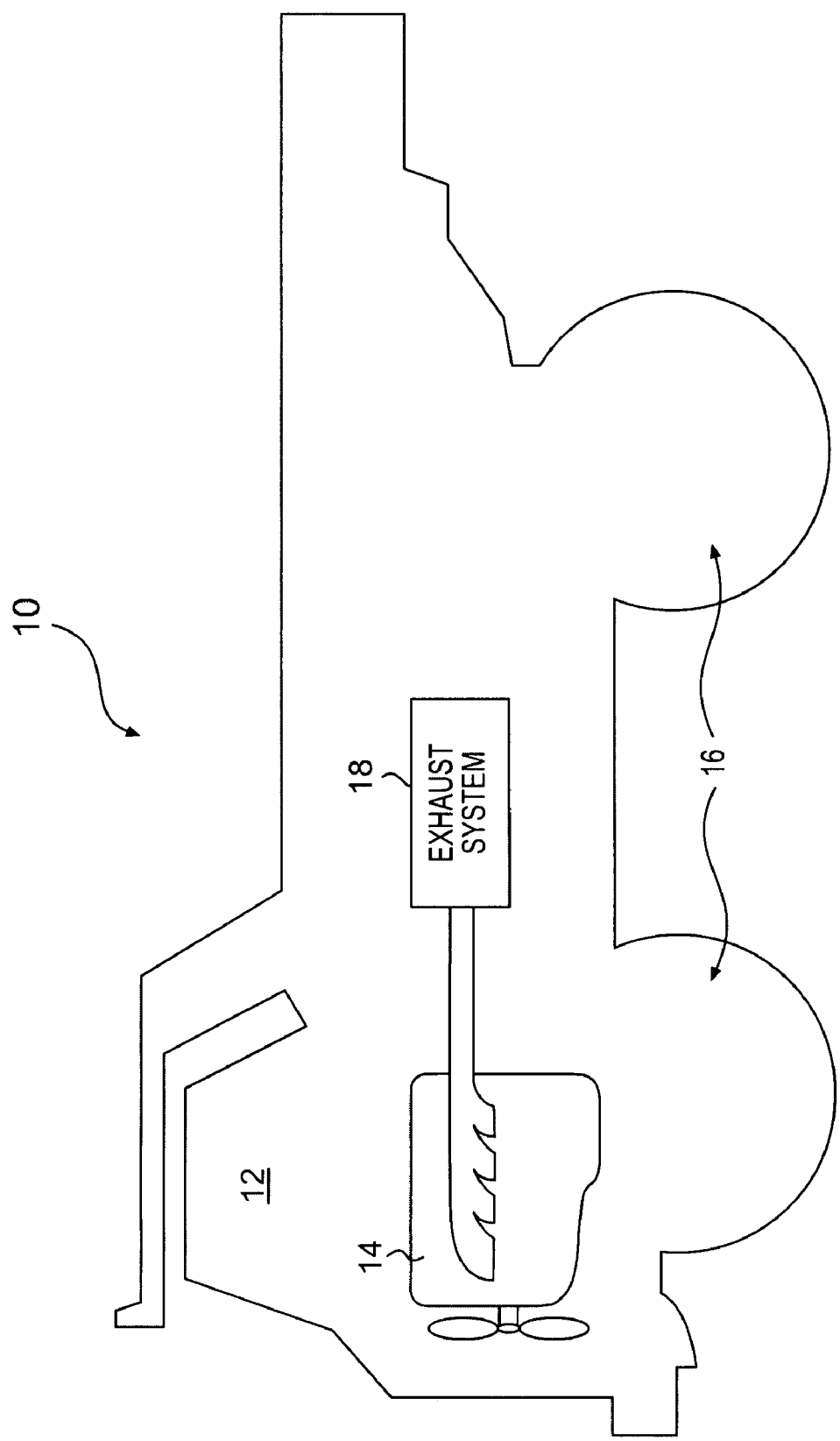
FIG. 1 is a diagrammatic illustration of an exemplary machine.

FIG. 1 illustrates an exemplary machine 10 having multiple systems and components that cooperate to accomplish a task. The tasks performed by machine 10 may be associated with a particular industry such as mining, construction, farming, transportation, or any other industry known in the art. For example, machine 10 may embody an on- or off-highway haul truck, as depicted in FIG. 1, an excavation machine, a passenger vehicle, a generator set, a marine vessel, a pumping mechanism, or any other suitable task-performing machine.

Machine 10 may include an operator station 12, from which operator control of machine 10 may be affected. Machine 10 may also include an engine 14 configured to power operations of machine 10. Engine 14 may, among other things, drive traction devices 16, e.g., wheels, tracks, or belts, to propel machine 10. Engine 14 may embody a combustion engine, e.g., a diesel engine, a gasoline engine, a gaseous fuel powered engine, a natural gas engine, or any other type of exhaust-producing engine known in the art. Machine 10 may also include an exhaust system 18 for managing exhaust gases produced by engine 14. Exhaust system 18 may, for example, remove pollutants from the exhaust flow, attenuate noise, generate auxiliary power, and/or otherwise treat the exhaust flow from engine 14.

Figure 2:
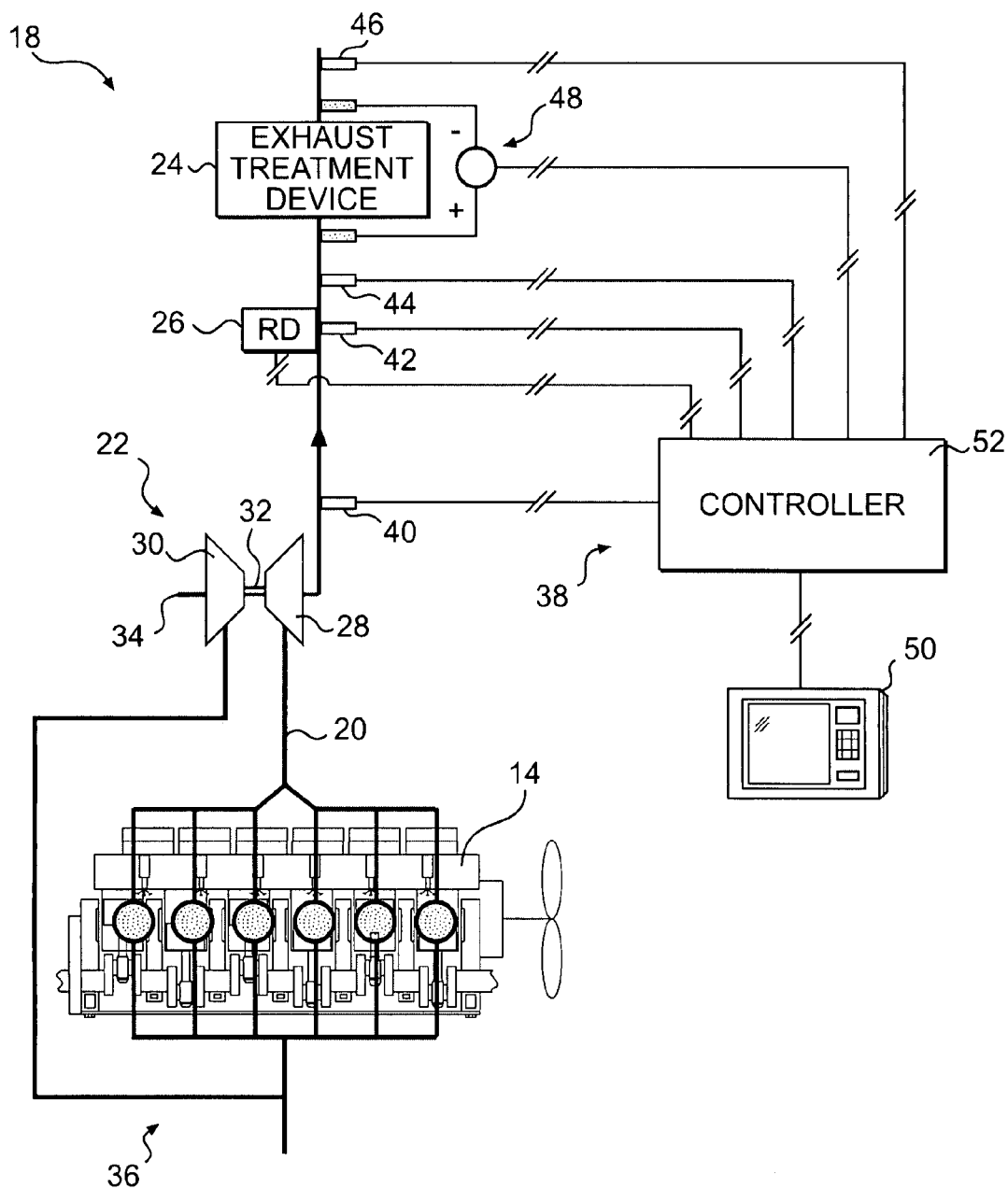
FIG. 2 is a diagrammatic illustration of an exemplary disclosed exhaust system for use with the machine of FIG. 1.

FIG. 2 shows an exemplary exhaust system 18. Exhaust system 18 may include one or more devices disposed along an exhaust conduit 20 configured to direct all or a portion of the exhaust gases away from engine 14. These devices may include, among other things, a turbocharger 22, an exhaust treatment device 24, and a regeneration device 26. It is to be appreciated that exhaust system 18 may include multiple exhaust conduits 20 (e.g., for multiple engines or a Vee engines), each having associated devices, if desired.

Turbocharger 22 may include a turbine 28 and a compressor 30 linked by a shared axle 32. Conduit 20 may direct the exhaust flow produced by engine 14 to turbine 28, causing turbine 28 to rotate axle 32 and thereby drive compressor 30. Compressor 30, in turn, may draw in ambient air via an inlet 34 and compress the ambient air. The compressed air may then be delivered to an engine air intake 36, allowing more fuel to enter the engine cylinders (not shown) during compression and increasing the output power of engine 14.

Exhaust treatment device 24 may be any type of device configured to remove one or more constituents from the exhaust flow of engine 14. In one embodiment, exhaust treatment device 24 may include a particulate trap or filter (not shown) configured to remove particulate matter, such as soot, from the exhaust flow of engine 14. The particulate trap or filter may embody a filter medium, e.g., a metal mesh or screen, a porous ceramic material, such as cordierite, or another medium known in the art to remove (i.e., trap) one or more types of particulate matter from exhaust gases. Although exhaust treatment device 24 is discussed herein primarily as being a particulate trap, it should be appreciated that, in other embodiments, exhaust treatment device 24 may alternatively or additionally include multifunctional devices, such as, for example, a catalytic converter and particulate trap combination or a catalytic particulate trap.

Regeneration device 26 may include any means known in the art to thermally regenerate exhaust treatment device 24. During operation of engine 14, accumulation of exhaust flow constituents in exhaust treatment device 24 may result in a decline in engine performance and/or possible damage to exhaust treatment device 24 and/or other components of exhaust system 18. Regeneration device 26 may be configured to raise the temperature of exhaust treatment device 24 to a temperature sufficient to combust (i.e., burn off) at least some of the particulate matter accumulation in exhaust treatment device 24. Engine performance may thus be restored and/or potential damage to exhaust treatment device 24 and/or other components of exhaust system 18 and/or machine 10 may be avoided. For instance, regeneration device 26 may be a flame-producing burner, a heating element, or another suitable device to raise the temperature of exhaust treatment device 24 by transferring heat directly thereto and/or to the exhaust flow upstream of exhaust treatment device 24. Alternatively or additionally, regeneration device 26 may include a catalyst and be configured to introduce reductant into the exhaust flow in the presence of the catalyst, causing a heat-generating reaction that raises the temperature of the exhaust flow, thereby regenerating exhaust treatment device 24.

In another embodiment, exhaust treatment device 24 may be regenerated by, for example, altering engine operation parameters that affect exhaust gas temperature. Running engine 14 with a "rich" air/fuel mixture may increase exhaust gas temperature. Increases in engine speed and/or load may also increase exhaust gas temperature. Timing and exhaust valve actuation may also be manipulated to control exhaust gas temperatures. Exhaust gases may also be heated by post injection. That is, additional fuel may be injected into the combustion chambers after the combustion has taken place, causing the additional fuel to be burned and thereby elevating the temperature of the exhaust gases in exhaust system 18.

Although exhaust system 18 is shown in FIG. 2 as having a single exhaust treatment device 24 and a single regeneration device 26, exhaust system 18 may include more than one exhaust treatment device 24 and/or more than one regeneration device 26. For example, in one embodiment, exhaust system 18 may include a single regeneration device 26 configured to regenerate two exhaust treatment devices. In another embodiment, exhaust system 18 may include two regeneration devices configured to regenerate two exhaust treatment devices. In such an embodiment, each regeneration device may be configured to regenerate one of the exhaust treatment devices or contribute to the regeneration of both of the exhaust treatment devices. That is, exhaust system 18 may include any suitable number and arrangement of regeneration devices 26 and/or exhaust treatment devices 18.

Exhaust system 18 may include additional and/or different exhaust treatment devices (not shown) disposed along exhaust conduit 20, if desired. For example, exhaust system 18 may include a NOx trap, an exhaust gas recirculation (EGR) cooler, an oxidation catalyst, a selective catalytic reduction (SCR) device, a combination of catalysts, or any other exhaust treatment devices known in the art.

Exhaust system 18 may also include a control system 38 configured to receive and/or to monitor information from various sources and to control one or more operations of exhaust system 18 based on this information. As shown by FIG. 2, control system 38 may include a turbocharger temperature sensor 40, a regeneration device temperature sensor 42, an exhaust treatment device inlet temperature sensor 44, an exhaust treatment device outlet temperature sensor 46, an exhaust treatment device differential pressure sensor 48, and a display 50 in communication with a controller 52.

Temperature sensors 40-46 may be arranged along exhaust conduit 20 and configured to measure the temperature of the exhaust flow within exhaust conduit 20 at their respective locations. That is, turbocharger temperature sensor 40 may measure a temperature of the exhaust flow at an outlet of turbocharger 22 (e.g., immediately downstream); regeneration device temperature sensor 42 may measure a temperature of the exhaust flow at or near regeneration device 26 (e.g., immediately downstream); exhaust treatment device inlet temperature sensor 44 may measure a temperature of the exhaust flow at or near the inlet of exhaust treatment device 24 (i.e., immediately upstream); and exhaust treatment device outlet temperature sensor 46 may measure a temperature of the exhaust flow at or near the outlet of exhaust treatment device 24 (i.e., immediately downstream). It is to be appreciated that additional temperature and/or pressure sensors (not shown) may similarly be arranged with respect to any other exhaust system devices (e.g., a NOx trap, an exhaust gas recirculation (EGR) cooler, an oxidation catalyst, a selective catalytic reduction (SCR) device, etc.).

Temperature sensors 40-46 may embody, for example, thermocouples, thermal resistors, or other temperature sensors configured to generate a signal indicative of a sensed temperature or a difference between the sensed temperature and an a reference temperature. These signals may be communicated to controller 52 for subsequent determinations. Differential pressure sensor 48 may comprise any means to determine a pressure differential between the pressures of the exhaust flow upstream and downstream of exhaust treatment device 24. That is, differential pressure sensor 48 may measure a pressure drop across exhaust treatment device 24. Differential pressure sensor 48 may generate a signal indicative of the pressure difference, which may be communicated to controller 52 for subsequent determinations.

Display 50 may include a screen, e.g., a cathode ray tube (CRT), a liquid crystal display (LCD), a plasma screen, a touch-screen, or the like. Display 70 may be configured to display information about operating parameters of exhaust system 18 and/or other systems of machine 10. Display 50 may include and/or otherwise be associated with one or more warning indicators, e.g., warning lamps, LEDs, etc. Display may 50 be positioned at any suitable location on machine 10, e.g., in operator station 12.

Controller 52 may include any means for receiving machine operating parameter-related information and/or for monitoring, recording, storing, indexing, processing, and/or communicating such information. These means may include components such as, for example, a memory, one or more data storage devices, a central processing unit (CPU), or any other components that may be used to run an application. Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Various other known circuits may be associated with controller 52, such as power supply circuitry, signal-conditioning circuitry, solenoid driver circuitry, communication circuitry, and other appropriate circuitry.

Controller 52 may be an engine control module (ECM) or another device that performs processing and controlling functions such as engine management and exhaust system control, among other things. Alternatively, controller 52 may include multiple controllers (not shown), each dedicated to perform one or more of these or other functions. Such multiple controllers may be configured to communicate and cooperate with one another. Controller(s) 52 may communicate with sensors 40-48 and/or with other associated devices using non-proprietary or proprietary communication protocols known in the art, e.g., SAE J1939, SAE 1587, etc. The communications may be implemented using any suitable networking strategy and/or infrastructure, e.g., a controller area network (CAN), Flexray, Ethernet, wireless (e.g., 802.11b, Bluetooth), etc.

Controller 52 may be configured to activate regeneration device 26 (i.e., affect a "regeneration event") in response to one or more trigger conditions. These trigger conditions may include, for example, a determination that a predetermined amount of particulate matter is or may be trapped in exhaust treatment device 24; that engine 14 has been operated for a predetermined amount of time; that a predetermined amount of fuel has been consumed; that a predetermined pressure drop across exhaust treatment device 24 has been reached; and/or any other suitable trigger condition. If one or more of these or other suitable trigger conditions are met, controller 52 may activate regeneration device 26 to reduce the particulate matter buildup in exhaust treatment device 24.

Regeneration device 26 may also be activated manually by an operator, owner, service technician, etc. of machine 10. The manual activation may be accomplished via a switch, button, or the like associated with machine 10 and/or a service tool configured to interface with machine 10. Alternatively or additionally, in response to the satisfaction of one or more of the trigger conditions, controller 52 may regulate one or more valves (e.g., fuel/air pressure regulation valves) to effectuate a "rich" air/fuel mixture and/or post injection, as discussed above, thereby increasing the temperature of the exhaust flow and regenerating exhaust treatment device 24.

Controller 52 may also be configured to terminate the regeneration event upon the satisfaction of one or more termination trigger conditions. These trigger conditions may include, for instance, a determination that a predetermined amount of time has elapsed since regeneration was initiated; that the one or more of temperature sensors 40-46 measures a predetermined target temperature (e.g., a target combustion temperature); that the pressure drop across exhaust treatment device 24 has fallen to a predetermined level; and/or that any other suitable termination condition has been satisfied.

During operation of machine 10, however, temperature sensors 40-46 may be damaged from the high exhaust flow temperatures and/or other environmental factors. In one example, the insulation surrounding the thermocouples (or thermal resistors, etc.) may be broken or otherwise compromised. Further, if exposed, the heat from the exhaust flow may fuse the electrical conductors of the thermocouples (or thermal resistors, etc.) at undesired locations along the lengths thereof. In another example, the vibrations induced during operation of machine 10 may loosen the fasteners (not shown) holding temperature sensors 40-46 in position, allowing temperature sensors 40-46 to be displaced from their proper locations. Thus, temperature sensors 40-46 may measure and indicate incorrect temperatures. In another example, dirt, dust, and/or other debris may accumulate on or near connection surfaces between the wiring harness and controller 52. The accumulation of debris may change the electrical resistance at the connection surfaces and cause controller 52 to read a temperature that is not commensurate with the actual temperature measured by temperature sensors 40-46.

Under such circumstances, temperature sensors 40-46 may malfunction or otherwise inaccurately measure and/or indicate their respective temperatures. For instance, temperature sensors 40-46 may indicate a temperature lower than the actual temperature at their respective locations. Controller 52 may thus receive inaccurate indications of the temperature of the exhaust flow at these locations. The inaccurate temperature indications may cause controller 52 to improperly execute and control exhaust system operations, such as regeneration or diagnostic tests. For instance, controller 52 could initiate regeneration too often or too seldom or cause regeneration device 26 to over- or under-heat exhaust treatment device 24. Thus, exhaust system 18 may not function optimally. Fuel efficiency could be reduced, exhaust treatment device 24 could fail and/or be damaged (e.g., its usable lifetime reduced), etc. In addition, exhaust system diagnostic tests may not provide useful results.

During steady state exhaust system conditions lasting a sufficient period of time, each of temperature sensors 40-46 should measure substantially the same temperature (i.e., within tolerance). That is, exhaust system 18 should eventually reach thermal equilibrium when exhaust system steady state conditions have been maintained for a sufficient amount of time. As used herein, "exhaust system thermal equilibrium" is intended to mean a condition in which two or more locations along the exhaust flow path at which temperature sensors 40-46 are located have substantially the same temperature (i.e., within tolerance).

In a first example, during an engine idle state, the exhaust flow rate and the temperature of the exhaust produced by engine 14 should remain substantially constant. Thus, if the idle condition is maintained, the constant exhaust flow rate and temperature should eventually cause the exhaust flow at each of the respective temperature sensor locations to reach substantially the same temperature. For instance, the exhaust treatment device medium (e.g., a ceramic) may have thermal inertia. Thus, it may take longer for the outlet of the exhaust treatment device 24 (i.e., location of temperature sensor 46) to reach its steady state temperature than for the inlet of exhaust treatment device 24 (i.e., the location of temperature sensor 44). Likewise, the further downstream along exhaust conduit 20, the longer it may take for the particular location to reach the steady state temperature during the idle period.

In a second example, when engine 14 operates at a high and constant engine speed, the exhaust flow rate and the temperature of the exhaust gases from engine 14 should likewise remain substantially constant, albeit greater than during idling. Each of temperature sensors 40-46 should eventually indicate substantially the same temperature if the condition is maintained for a sufficient period of time. That is, exhaust system thermal equilibrium may be achieved if the high and constant engine speed is maintained for a sufficient period of time. This may occur, for example, when machine 10 is traveling along a flat highway at a constant speed, e.g., when cruise-control has been set on a flat highway. If the high and substantially constant engine speed is maintained, the constant exhaust flow rate should eventually cause the exhaust flow at each of the respective locations of temperature sensors 40-46 to reach substantially the same temperature.

In a third example, when engine 14 has been powered down for a sufficient period of time (i.e., the exhaust flow rate is zero), each of temperature sensors 40-46 should also measure substantially the same temperature. The temperature of exhaust conduit 20 at each of the respective locations of temperature sensors 40-46 should be substantially the same as the ambient temperature. That is, exhaust system thermal equilibrium may be achieved after engine 14 has been shut off for a sufficient amount of time.

In a fourth example, when controller 52 triggers a regeneration event and regeneration device 26 heats exhaust treatment device 24 for a period of time to combust particulate matter trapped therein, temperature sensors 44 and 46 should eventually indicate the same temperature. As discussed above, exhaust treatment device 24 may have thermal inertia. Thus, regeneration device 26 may effectuate an increase in the exhaust flow temperature upstream of exhaust treatment device 24 (i.e., at the inlet) prior to an increase in the exhaust flow temperature downstream of exhaust treatment device 24 (i.e., at the outlet). That is, exhaust treatment device 24 may "delay" the corresponding downstream temperature rise. After the thermal inertia of exhaust treatment device 24 is overcome, and the upstream heat propagates through exhaust treatment device 24 to downstream locations, the temperatures of the exhaust flow at the inlet and the outlet of exhaust treatment device 24 may be substantially the same. This thermal equilibrium condition may be achieved, for instance, toward the end of the regeneration event.

Controller 52 may thus utilize one or more of the above attributes of exhaust system 18 to check whether the temperature indications (i.e., the signals) received from temperature sensors 40-46 are inaccurate. That is, controller 52 may determine whether the temperature indications provided by temperature sensors 40-46 are reasonable under the circumstances. Controller 52 may monitor machine operating parameters, e.g., engine speed, ground speed, exhaust flow rate, exhaust flow temperatures, etc. Controller 52 may then compare the temperatures indicated by temperature sensors 40-46 during exhaust system thermal equilibrium—that is, when the respective temperatures theoretically ought to be substantially the same, within an acceptable tolerance range. Specifically, controller 52 may detect that one or more of these monitored operating parameters has remained substantially constant for a predetermined sufficient amount of time. Controller 52 may compare the temperature indicated by at least one of sensors 40-46 to the temperature indicated by at least one of the other temperature sensors 40-46 (e.g., each temperature sensor 40-46 to every other temperature sensor 40-46). In one aspect, controller 52 may, prior to the comparing, average the temperature values provided by each of temperature sensors 40-46, in order to account for minor temperature fluctuations (e.g., average temperature samples). Controller 52 may then perform the comparison(s) using the averaged temperature values, if desired.

Using a first strategy, for instance, controller 52 may track the amount of time the engine speed has remained at idle and/or the exhaust flow rate has remained substantially constant. When these parameter(s) have remained substantially constant for a predetermined sufficient period of time, stored in memory, controller 52 may determine that the exhaust flow temperature has reached steady state, i.e., that exhaust system 18 has reached thermal equilibrium, and that each of temperature sensors 40-46 should measure substantially the same temperature, within an acceptable tolerance. Controller 52 may thus compare the temperatures measured by sensors 40-46 upon the elapsing of the predetermined period of time. If the measured temperatures are not substantially the same, controller 52 may determine that one or more of temperature sensors 40-46 is malfunctioning or otherwise providing an inaccurate temperature indication. For example, temperature sensors 40, 44, and 46 may indicate substantially the same temperature, while temperature sensor 42 may indicate a different (e.g., a lower), temperature. Controller 52 may thus determine that temperature sensor 42 is malfunctioning or otherwise providing an inaccurate temperature indication based on such a comparison.

Using a second strategy, controller 52 may track the amount of time that engine 14 has been operating at a substantially constant, non-idle speed; that the exhaust flow rate has remained substantially constant; and/or that the ground speed of machine 10 has remained substantially constant. When one or more of these and/or other such parameter(s) have remained substantially constant for a predetermined sufficient period of time, stored in memory, controller 52 may determine that the exhaust flow temperatures have reached thermal equilibrium, and that each of temperature sensors 40-46 should indicate substantially the same temperature. Controller 52 may determine whether one or more of sensors 40-46 is malfunctioning or otherwise providing an inaccurate temperature indication based on a comparison of the temperatures indicated thereby, as discussed above (i.e., if the indicated temperatures are not substantially the same).

Using a third strategy, controller 52 may store in memory the time when engine 14 is powered down (or start a timer). When engine 14 is next powered up controller 52 may determine the amount of time engine 14 was powered down by comparing the current, start-up time to the shut-down time stored in memory (or reading the timer value). Controller 52 may then compare the amount of time engine 14 was powered down to a predetermined sufficient amount of time, stored in memory, to determine if engine 14 was shut down for a sufficient amount of time to allow the gases within conduit 20 to cool to the ambient temperature. That is, controller 52 may determine if engine 14 was off for a sufficient amount of time for exhaust system 18 to reach thermal equilibrium. If so, controller 52 may then determine whether one or more of sensors 40-46 is malfunctioning or otherwise providing an inaccurate temperature indication based on a comparison of the temperatures indicated thereby, as discussed above (i.e., if the indicated temperatures are not substantially the same).

Using a fourth strategy, controller 52 may compare the exhaust flow temperatures indicated by temperature sensors 44 and 46 during a regeneration event or shortly thereafter. For instance, controller 52 may compare the temperature indications a predetermined amount of time, stored in memory, after regeneration has been initiated and ensuring the exhaust flow temperatures at the inlet and outlet of exhaust treatment device 24 are substantially the same (e.g., towards the end of the regeneration event). That is, controller 52 may determine that thermal equilibrium with respect to the inlet and outlet of exhaust treatment device 24 has been achieved. Controller 52 may similarly determine whether one of temperature sensors 44, 46 is malfunctioning or otherwise providing an inaccurate temperature indication if the temperatures indicated thereby are not substantially the same, as discussed above.

In the strategies discussed above, it is to be appreciated that controller 52 may determine that one or more of temperature sensors 40-46 is malfunctioning or otherwise providing an inaccurate temperature indication (i.e., that the indicated temperatures are not substantially the same) if differences between the indicated temperatures are not within a predetermined tolerance (e.g., +/−5%, +/−30° C., etc.). Each strategy discussed above may require different tolerances. Further, each temperature sensor comparison may require a difference tolerance (e.g., a comparison of temperature sensors 40, 42 versus a comparison of temperature sensors 40, 46). The tolerances may depend on a variety of characteristics, e.g., the type of machine 10, the type of engine 14; the type of fuel used; the layout and arrangement of exhaust system 18; the exhaust temperatures; the exhaust treatment device filter medium; the sensitivity and/or accuracy of temperature sensors 40-46; which of sensors 40-46 are being compared; and/or other factors. For instance, if thermocouples are used, controller 52 may only be able to determine the respective temperatures of the exhaust flow within +/−15° C. In addition, the exhaust flow temperatures may not be exactly the same, even during exhaust system thermal equilibrium, due the environmental factors discussed above, among other things. As such, the tolerances may be selected based on experimental or simulation data gathered for the particular machine 10, exhaust system 18, and temperature sensor strategy employed.

Likewise, it is to be appreciated that the predetermined periods of time stored in memory may also depend on the same or other factors. For instance, in order for the exhaust flow temperatures to reach thermal equilibrium, it may take about 3 hours for exhaust system 18 to cool after engine 14 is shut down, depending on the ambient temperature; 1 hour of idling; and a half-hour of a high and constant engine speed. As such, the predetermined periods of time may also be determined and selected based on experimental or simulation data gathered for the particular machine 10 and/or exhaust system 18, as well as the particular temperature sensor strategy employed.

The manner in which controller 52 determines whether exhaust system thermal equilibrium has been reached may vary. For example, as discussed above, controller 52 may wait until one or more exhaust system 18 and/or engine 14 operating parameters have remained substantially constant for the predetermined sufficient amount of time. Alternatively or additionally, controller 52 may determine that exhaust system thermal equilibrium has been reached when one or more of temperature sensors 40-46 indicates that temperature of the exhaust flow at its respective location has stopped changing (i.e., reached a steady-state value). Controller 52 may, for example, determine that exhaust system thermal equilibrium has been reached when none of temperature sensors 40-46 has indicated a change in the exhaust flow temperature for 5 minutes. One of skill in the art will appreciate that exhaust system thermal equilibrium may be determined in other ways, if desired. For purposes of this disclosure, the manner in which exhaust system thermal equilibrium (i.e., the temperatures at the respective points along the exhaust flow are substantially the same) is determined, satisfied, and/or detected is immaterial.

Controller 52 may be configured to affect one or more system reactions if it is determined that one or more of temperature sensors 40-46 is malfunctioning or otherwise providing an inaccurate temperature indication. For instance, controller 52 may illuminate a warning indicator (e.g., a "check engine" light) associated with display 50 and/or communicate with and notify an associated off-board system (not shown), such as a dealer or service location, of the condition. Alternatively or additionally, controller 52 may sound an audible alert or an alarm upon such a determination. Controller 52 may also log a fault in response to the determination. For instance, controller 52 may store a suitable fault code in a machine operation log (not shown) maintained by controller 52. The fault code may be used by a technician to diagnose and remedy the problem during maintenance or repair of machine 10.

The system reactions may also include affecting a precautionary exhaust system mode such as, for example, terminating a current exhaust treatment device regeneration event; precluding further exhaust treatment device regeneration events; precluding exhaust system diagnostic tests until the malfunctioning temperature sensor condition is remedied (e.g., a technician repairs and resets the condition); disabling SCR dosing; engine de-rating (i.e., limiting engine speed, power output, and/or torque output); disabling compressed air intake; switching exhaust gas recirculation (EGR) modes (e.g., closed loop/open loop); and/or powering down machine 10 and/or engine 14. It is to be appreciated, however, that "affecting a system reaction," as used herein, may refer to any other suitable reactionary measure taken in response to a detection that one or more of temperature sensors 40-46 is malfunctioning or otherwise providing an inaccurate temperature indication.

INDUSTRIAL APPLICABILITY

The disclosed exhaust system may be useful to enhance exhaust emissions control for combustion engines. In particular, the disclosed exhaust system may be useful to detect when one or more of the temperature sensors disposed along the exhaust flow of an engine has malfunctioned and is indicating an inaccurate temperature. By comparing the temperatures indicated by each of the temperature sensors during exhaust system thermal equilibrium, i.e., when each location along the exhaust flow has substantially the same temperature, inaccurate temperature indications may be comparatively identified.

Further, by affecting an appropriate system reaction, e.g., by triggering an alert, logging a fault code, terminating and/or precluding future regeneration events, precluding exhaust system diagnostic tests, and/or affect any other system reaction discussed above in response to a detected exhaust temperature sensor malfunction, the effects of operating the machine in this undesirable state may be reduced or avoided. Specifically, improper operation of the exhaust system, e.g., excessive or insufficient regeneration events; failure of the exhaust treatment device; decreased fuel efficiency; and/or excess emissions may be avoided. In addition, it can be ensured that exhaust system diagnostic tests are performed only when the exhaust system is in proper working order.

It will be apparent to those having ordinary skill in the art that various modifications and variations can be made to the disclosed exhaust system without departing from the scope of the disclosure. Other embodiments will become apparent upon consideration and practice of the disclosure. For example, strategies other than those discussed above may be utilized to compare the temperatures indicated by the exhaust system temperature sensors during exhaust system thermal equilibrium, i.e., at times when the respective temperatures along the exhaust flow ought to be substantially the same. It is intended that the specification and examples be considered as exemplary only, with a true scope of the invention being indicated by the following claims and their equivalents.

What is claimed is:

1. A machine, comprising:
a combustion engine configured to power operations of the machine; and
an exhaust system configured to manage an exhaust flow produced by the engine, the exhaust system comprising:
a first sensor disposed to sense a first temperature of the exhaust flow;
a second sensor disposed to sense a second temperature of the exhaust flow; and
a controller in communication to receive from the first and second sensors signals indicative of the first and second temperatures, the controller being configured to:
compare the signals indicative of the first and second temperatures during exhaust system thermal equilibrium;
determine whether at least one of the signals indicative of the first and second temperatures is inaccurate based on the comparison; and
affecting a system reaction if it is determined that at least one of the signals indicative of the first and second temperatures is inaccurate.

2. The machine of claim 1, wherein the system reaction includes at least one of logging a fault, alerting an operator, and implementing a precautionary exhaust system operating mode.

3. The machine of claim 1, wherein it is determined that at least one of the signals indicative of the first and second temperatures is inaccurate if the comparison indicates that first and second temperatures are not substantially the same.

4. The machine of claim 1, wherein the exhaust system thermal equilibrium occurs prior to starting the engine.

5. The machine of claim 1, wherein the exhaust system thermal equilibrium occurs while at least one of a rate of the exhaust flow is substantially constant and a speed of the engine is substantially constant.

6. The machine of claim 1, further including:
a exhaust treatment device arranged within the exhaust flow;
a regeneration device configured to heat the exhaust treatment device for a period of time in response to a command from the controller, wherein:
the first sensor is located at or near an inlet of the exhaust treatment device,
the second sensor is located at or near an outlet of the exhaust treatment device, and
the exhaust system thermal equilibrium occurs during the period of time.

7. An exhaust system, comprising:
a first sensor disposed to sense a first temperature of an exhaust flow;
a second sensor disposed to sense a second temperature of the exhaust flow;
a controller in communication to receive from the first and second sensors signals indicative of the first and second temperatures, the controller being configured to:
compare the signals indicative of the first and second temperatures during exhaust system thermal equilibrium;
determine whether at least one of the signals indicative of the first and second temperatures is inaccurate based on the comparison; and
affect a system reaction if it is determined that at least one of the signals indicative of the first and second temperatures is inaccurate.

8. The system of claim 7, wherein the system reaction includes at least one of logging a fault, alerting an operator, and implementing a precautionary exhaust system operating mode.

9. The system of claim 7, wherein it is determined that at least one of the signals indicative of the first and second temperatures is inaccurate if the comparison indicates that first and second temperatures are not substantially the same.

10. The system of claim 7, wherein the exhaust system thermal equilibrium occurs prior to starting an engine associated with the exhaust system.

11. The system of claim 7, wherein the exhaust system thermal equilibrium occurs while a rate of the exhaust flow is substantially constant.

12. The system claim 11, wherein the exhaust flow is produced by an engine and the exhaust system thermal equilibrium corresponds to a substantially constant engine speed.

13. The system of claim 7, further including:
a exhaust treatment device arranged within the exhaust flow;
a regeneration device configured to heat the exhaust treatment device for a period of time in response to a command from the controller, wherein:
the first sensor is located at or near an inlet of the exhaust treatment device,
the second sensor is located at or near an outlet of the exhaust treatment device, and
the exhaust system thermal equilibrium occurs during the period of time.

14. An exhaust system sensor verification method, comprising:
sensing a first and second temperatures of an exhaust flow;
providing indications of the first and second sensed temperatures;
comparing the indications of the first and second sensed temperatures during an exhaust system exhaust system thermal equilibrium;
determining whether at least one of the indications of the first and second sensed temperatures is inaccurate based on the comparison; and
affecting a system reaction if it is determined that at least one of the indications of the first and second sensed temperatures is inaccurate.

15. The method of claim 14, wherein the system reaction includes at least one of logging a fault, alerting an operator, and implementing a precautionary exhaust system operating mode.

16. The method of claim 14, wherein it is determined that the at least one of the indications of the first and second sensed temperatures is inaccurate if the comparison indicates that first and second sensed temperatures are not substantially the same.

17. The method of claim 14, wherein the exhaust system thermal equilibrium occurs prior to starting an engine associated with the exhaust system.

18. The method of claim 14, wherein the exhaust system thermal equilibrium occurs while a rate of the exhaust flow is substantially constant.

19. The method of claim 18, wherein the exhaust flow is produced by an engine and the exhaust system thermal equilibrium corresponds to a substantially constant engine speed.

20. The method of claim 14, further including:

heating an exhaust treatment device within the exhaust flow path for a period of time, wherein:

the first temperature is sensed at or near an inlet of the exhaust treatment device, the second temperature is sensed at or near an outlet of the exhaust treatment, and the exhaust system thermal equilibrium occurs during the period of time.

* * * * *